Aug. 29, 1950 R. F. WILD 2,520,485
SAFE FAILURE MEASURING AND CONTROLLING APPARATUS
Filed Aug. 31, 1948 2 Sheets-Sheet 1

INVENTOR.
RUDOLF F. WILD
BY Arthur H. Swanson
ATTORNEY.

Aug. 29, 1950  R. F. WILD  2,520,485
SAFE FAILURE MEASURING AND CONTROLLING APPARATUS
Filed Aug. 31, 1948  2 Sheets-Sheet 2

INVENTOR.
RUDOLF F. WILD
BY Arthur H. Swanson
ATTORNEY

Patented Aug. 29, 1950

2,520,485

UNITED STATES PATENT OFFICE 2,520,485

SAFE FAILURE MEASURING AND CONTROLLING APPARATUS

Rudolf F. Wild, Wilmington, Del., assignor, by mesne assignments, to Minneapolis-Honeywell Regulator Company, Minneapolis, Minn., a corporation of Delaware Application August 31, 1948, Serial No. 47,024

10 Claims. (Cl. 318—28)

1

The present invention relates to measuring and control apparatus of known type, comprising an electronic voltage amplifier by which variations in a minute voltage being measured are amplified so that they may control the operation of mechanism including a motor employed to effect measuring and control operations on and in accordance with said variations. In its most usual form, the apparatus to which the invention relates is a self-balancing potentiometer mechanism of a type in wide use and disclosed and claimed in the Wills Patent 2,423,540 of July 8, 1947. More particularly, the present invention relates to apparatus of the above mentioned type which includes safe failure provisions heretofore devised by me which are disclosed and claimed in my prior applications, Serial Nos. 678,255, filed June 21, 1946, now matured into Patent No. 2,457,-791, issued December 28, 1948, and 735,009, filed March 15, 1947, now matured into Patent No. 2,452,023, issued October 19, 1948.

The safe failure improvements disclosed in my prior applications are characterized in particular by the provision of a feed-back connection between the output and input circuits of the amplifier, which operates, if the apparatus is in its normal operative condition, to produce a high frequency oscillation signal which can pass through and be amplified in the amplifier along with the low frequency signal through which the rebalancing motor or analogous device is normally controlled on and in accordance with variations in the voltage measured. In effect, said high frequency signal rides through the amplifier on top of the low frequency signal so that an increase in the magnitude of the low frequency signal, if great enough, will result in clipping or interrupting of the high frequency signal as a result of cut-off or plate current saturation in the amplifier. In practice, any one of a variety of apparatus defects will cause the normal low frequency motor drive signal to become abnormally large and thereby cause the high frequency signal to disappear. In said prior applications, the disappearance of the high frequency oscillation normally indicates defective apparatus and causes a relay mechanism to actuate an alarm and/or some element which by its actuation contributes to the safe operation of the system.

To make a safe failure system of the type and form disclosed in said prior applications suitably sensitive to apparatus defects tending to increase the magnitude of the low frequency motor drive signal, it is practically essential that the maximum motor speed should be lower than is desirable under some operating conditions. For example, in successively measuring the voltage of a plurality of thermocouples, two successively measured voltages may vary widely, and in such case operation of the rebalancing motor at full speed is desirable. The primary object of the present invention is to provide a safe failure system, of the general type disclosed in said prior applications, which will permit full speed operation of the rebalancing motor when the apparatus is in its normal operative condition, without reducing the sensitivity of the safe failure system to apparatus defects tending to abnormally increase the low frequency motor drive signal.

A more specific object of the present invention is to effect a relatively simple modification of the high frequency detection relay circuit, of the type disclosed in my prior applications, so that a signal derived from the control winding of the rebalancing motor, and in proportional relation to the motor speed, may be applied to the relay circuit in such manner that said circuit will be maintained in its normal operating condition when the high frequency signal disappears as a result of a mere increase in the motor drive signal to the value required for full speed operation of the motor.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention. Of the drawings:

Figure 1:
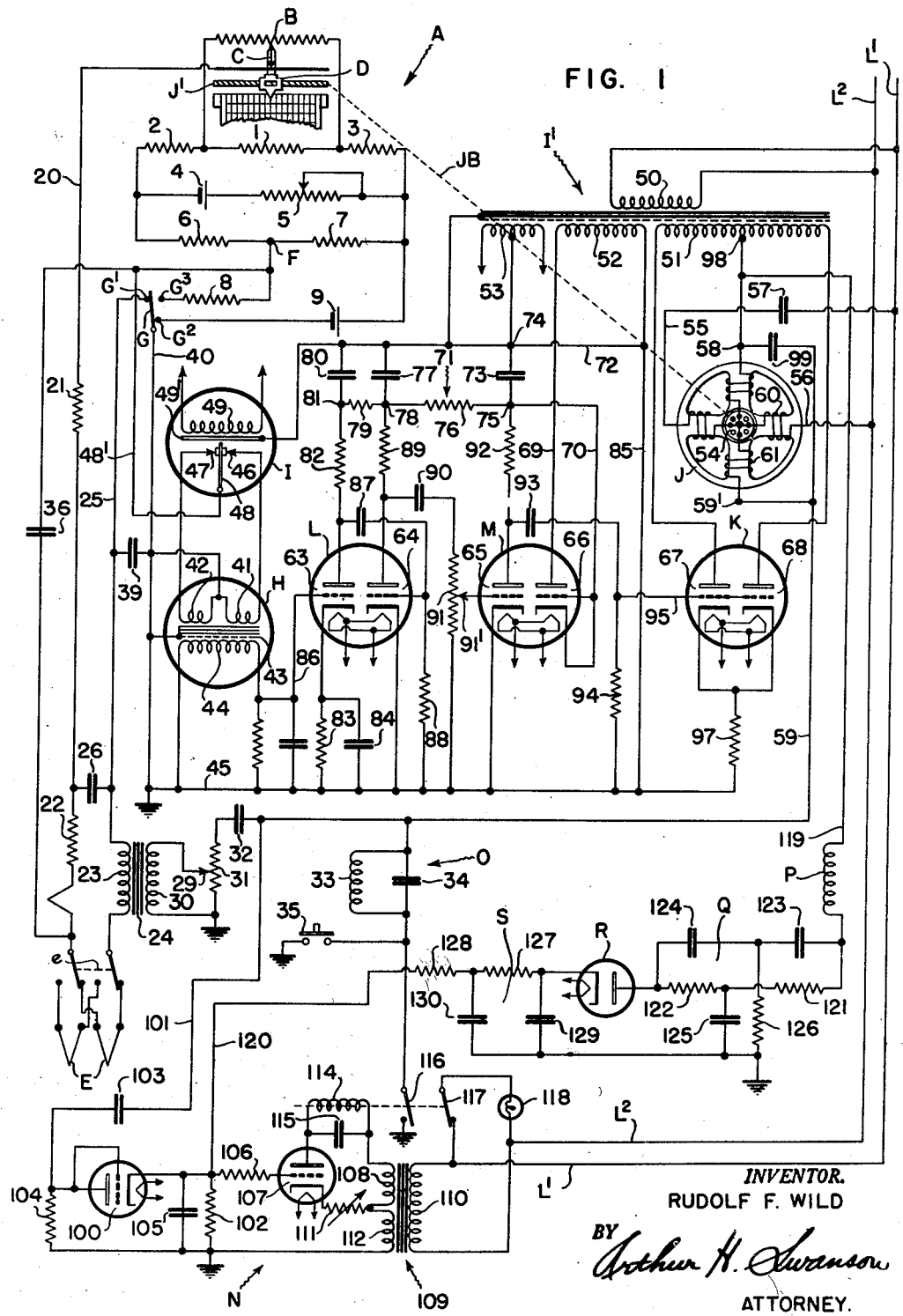
Fig. 1 is a diagrammatic representation of potentiometric apparatus including an embodiment of the present invention.

In Fig. 1, I have diagrammatically illustrated the use of the present invention in potentiometric measuring and control apparatus of the so-called conversion type disclosed in the above-mentioned prior patent of Wills, No. 2,423,540. In said apparatus, the potentiometric rebalancing operations are effected by a reversible electric motor J and an automatic motor control system which includes an electronic amplifier and means comprising a vibrator I and transformer H which cooperate to impress on the electronic amplifier an alternating control voltage varying in magnitude and phase with the magnitude and direction of the differences between the unidirectional voltages of thermocouples E successively connected to the measuring apparatus by a selector switch e.

The apparatus shown diagrammatically in Fig. 1 comprises a potentiometric bridge circuit A including a slide wire resistance B along which a slider contact C is adjusted through a shaft J' which is rotated by the motor J through a mechanical adjusting element JB and is in threaded engagement with the pen carriage D carrying the contact C. The circuit A is shown as of conventional type comprising one branch including series connected resistances 1, 2 and 3, an energizing branch connected in parallel with the first mentioned branch and including a source of current 4 and a regulable resistance 5 connected in series, and a third branch connected in parallel with the energizing branch and with the first mentioned branch and including series connected resistances 6 and 7. The slide wire resistance B is connected in parallel with the resistance 1 between and in series with the resistances 2 and 3.

Associated with the bridge circuit A is a standardizing switch. The latter, as conventionally shown, comprises a movable two-position switch member G and switch contacts G', G², and G³. In the normal operating position of the switch member G, it engages the contact G' and connects the thermocouple E between the slider contact C and the junction point F of the bridge resistances 6 and 7. In its recalibrating position, the switch member G engages and forms a bridge connection between the contacts G² and G³ and thereby connects a resistance 8 and a standard cell 9 in series with the bridge resistance 7. In respect to its features just specifically mentioned, the apparatus shown diagrammatically in Fig. 1 does not differ significantly from the apparatus shown in said Wills patent.

As shown, the circuit branch connecting slider contact C and bridge point F includes in series between the contact C and switch contact G', one of the thermocouples E, conductor 20, resistances 21 and 22, the secondary winding 23 of a transformer 24, and a conductor 25. The circuit elements 22, E and 23 are shunted by a condenser 26. The transformer 24 couples the input and output circuits of the electronic amplifying and control system shortly to be described. The primary winding 30 of the transformer 24 has one terminal connected to ground and has its other terminal connected by a slider contact 29 to a potentiometer resistance 31. The latter has one terminal connected to ground and has its other terminal connected through a condenser 32 to a conductor 59 and to one terminal of a tuned circuit element O comprising a parallel connected inductance coil 33 and condenser 34. The conductor 59 is connected to one terminal 59' of the control winding 61 of the motor J. The second terminals of the coil 33 and condenser 34 may be connected to ground by a manually actuated starting switch 35, and the ground connection thus made may be maintained in normal operation by a relay switch 116 associated with a high frequency detection and relay circuit N hereinafter described. The terminal of the thermocouple E connected to the resistance 22 is directly connected to the bridge point F by a condenser 36.

The circuit connection between the switch contact G' and the bridge point F, closed by the movement of the switch member G into engagement with the contact G', includes a conductor 40 connecting the switch member G to the midpoint of the two sections 41 and 42 of the primary winding of the transformer H. A condenser 39 connects the conductors 40 and 25 for a purpose hereinafter explained. The core structure and casing of the transformer H and a shield 43 interposed between the transformer primary windings and its secondary winding 44 are connected to a grounding conductor 45. The latter is also connected to the junction point of the primary winding sections 41 and 42. The remote ends or terminals of the primary winding sections 41 and 42 are connected to the stationary contacts 46 and 47, respectively, of the vibrator I. The latter comprises a vibrating reed 48 carrying a contact moved by the vibration of the reed back and forth between the contacts 46 and 47 which it alternately engages.

The vibrating reed 48 is connected by conductor 48' to the bridge point F. The reed 48 is caused to vibrate by a winding 49 having its terminals connected to a source of alternating current. A permanent magnet 49', connected to ground, is associated with the reed 48 for polarizing and synchronizing purposes, and in operation the reed 48 is in continuous vibration with a frequency corresponding to that of the source of energization for the winding 49. In consequence, the currents flowing alternately through the winding sections 41 and 42 create alternating voltages in the secondary winding 44 well adapted for amplification in the electronic relay to the input terminals of which the terminals of the transformer secondary winding 44 are connected.

Said electronic relay comprises a drive section and an amplifying section, both of which receive energizing current from a transformer I' having its primary winding 50 connected to the supply conductors L' and L² and having three secondary winding sections 51, 52, and 53. The drive section of the electronic relay comprises the reversibly rotating motor J and an electronic tube K. The amplifying section comprises amplifying tubes L and M.

The motor J, as diagrammatically shown, comprises a rotor 54 mechanically coupled to the threaded shaft J', the rotation of which, as diagrammatically shown, simultaneously adjusts the contact C and the pen carriage D. The motor J has a pair of terminals 55 and 56 connected through a condenser 57 of suitable value to the alternating current supply conductors L' and L², and has a second pair of terminals 58 and 59'. The terminal 58 is connected to the midpoint 98 of the secondary winding 51, and terminal 59' is connected to ground through the conductor 59 and the circuit O when either of switches 35 and 116 is closed. For its intended use, the motor J may be of the form schematically shown in the drawings in which one pair of oppositely disposed field poles is surrounded by a winding 60 connected between the motor terminals 55 and 56, and the other pair of poles is surrounded by a winding 61 connected between the motor terminals 58 and 59'.

Since the value of the condenser 57 is so chosen as to produce with the winding 60 a series resonant circuit, the current flowing through the motor winding 60 will be approximately in phase with the voltage of the alternating supply conductors L' and L². The current supply to the winding 61 will either lead or lag the voltage of the alternating current supply conductors L' and L² by approximately 90°. The windings 60 and 61 thus establish fields in the motor J which are displaced from one another approximately 90° in one direction or the other, depending upon whether the winding 61 is energized with current which leads or lags the voltage of the alternating supply conductors L' and L². As will become apparent from the subsequent description, the phase of the current flow through the winding 61 and the rotation of the rotor 54 depends upon, and is controlled by, the direction of unbalance of the potentiometric measuring circuit, and the duration of said rotation depends on the duration of said unbalance so that the rotation of the rotor 54 tends to adjust the contact C to the extent as well as in the direction to rebalance said circuit.

The alternating voltage generated in the secondary winding 44 of the transformer H is amplified through the action of the amplifying tubes L and M, and the amplification thus effected is utilized in energizing the phase winding 61 of the motor J to control the selective actuation of the latter for rotation of the rotor 54 in one direction or the other.

As shown, the electronic amplifying tube L includes two heater type triodes within the same envelope and designated by the reference symbols 63 and 64. The triode 63 includes anode, control electrode, cathode, and heater filament elements, and the triode 64 includes like elements. The filaments of the triodes 63 and 64 are connected in parallel and receive energizing current from the low voltage secondary winding 53 of the transformer I'. The conductors through which the secondary 53 supplies current to the heater filaments of the electronic tube L and also to the heater filaments of the tubes M, K, 100, R and 107 have not been shown in order not to complicate the drawings.

The electronic amplifying tube M includes two heater type triodes, designated by the reference characters 65 and 66, and within the same envelope. Both of the triodes of tube M include anode, control electrode, cathode and heater filament elements. The electronic tube K also includes two heater type triodes, which have been designated by the reference characters 67 and 68, within the same envelope, and which include anode, control electrode, cathode, and heater filament elements.

The triode 66 of the electronic valve M is utilized as a half-wave rectifier to provide a source of direct current voltage for energizing the anode or output circuits of the triodes 63, 64 and 65. As shown, the control electrode and cathode of the triode 66 are directly connected to each other, and the output circuit thereof is energized by the transformer secondary winding 52 through a circuit which may be traced from the left end terminal of the winding 52, as seen in the drawings, through the conductor 69 to the anode of the triode 66, the cathode thereof, and through a conductor 70 to the positive input terminal 75 of a filter generally designated by the reference numeral 71. The negative terminal 74 of filter 71 is connected by a conductor 72 to the right end terminal of the transformer secondary winding 52 which in turn is connected through the conductor 85 to the grounded conductor 45.

The filter 71 includes a condenser 73 which operates to smooth out the ripple in the output voltage of the filter between the points 74 and 75. The filter 71 also includes a resistance 76 and a condenser 77 which operate to smooth out the output voltage of the filter between the points 74 and 78. The filter 71 includes a further resistance 79 and a condenser 80 for smoothing out the output voltage between the filter points 74 and 81. The filter, therefore, comprises three stages. Such a three-stage filter is provided because for satisfactory and efficient operation it is desirable that the anode voltage supplied to the triode 63 be substantially free from ripple whereas it is not necessary to supply anode voltage so completely free from ripple to the output circuit of the triode 64. Likewise it is not necessary to supply anode voltage as free from ripple to the triode 65 as to the triode 64.

The anode circuit of the triode 63 may be traced from the filter point 81, which comprises the positive output terminal of the filter, through a fixed resistance 82 to the anode of the triode 63, to the cathode thereof, and through a cathode biasing resistance 83, which is shunted by a condenser 84, to the negative filter point 74 through the previously mentioned grounded conductor 45, the conductor 85 and the conductor 72. The cathode biasing resistance 83 and the parallel connected condenser 84 are utilized for biasing the control electrode of the triode 63 negatively with respect to its associated cathode.

The input circuit of the triode 63 may be traced from the cathode to the parallel connected resistance 83 and condenser 84, through the transformer secondary winding 44, and through a conductor 86 to the control electrode of the triode 63.

The output circuit of the triode 63 is resistance-capacity coupled to the input circuit of the triode 64 by means of a condenser 87 and a resistance 88. More particularly, the anode of the triode 63 is connected by condenser 87 to the control electrode of the triode 64, and the control electrode of the triode 64 is connected through the resistance 88 to the grounded conductor 45 and thereby to the grounded cathode of the triode 64. The anode circuit of the triode 64 may be traced from the positive terminal 78 of the filter 71 through a fixed resistance 89 to the anode of the triode 64, the cathode thereof, and conductors 45, 85 and 72 to the negative terminal 74 of the filter.

The output circuit of the triode 64 is resistance-capacity coupled to the input circuit of the triode 65 by means of a condenser 90 which is connected between the anode of the triode 64 and the control electrode of the triode 65, and by means of a resistance 91 which is connected between the control electrode of the triode 65 and the grounded cathode thereof. It is noted that the resistances 88 and 91 which are connected to the input circuits of the triodes 64 and 65, respectively, operate to maintain the control electrodes of the triodes 64 and 65 at the same potentials as their associated cathodes when no voltage is induced in the transformer secondary winding 44, but upon the induction of an alternating voltage in the secondary winding 44, resistances 88 and 91 permit the flow of grid current between the control electrodes of the triodes 64 and 65 and their associated cathodes and thereby limit the extent to which the control electrodes of these triodes are permitted to go positive with respect to their associated cathodes. With the control electrode of triode 65 connected to the resistance 91 by an adustable contactor 91', as shown, said resistance and contactor form a means for varying the amount of signal impressed on the control electrode of the triode 65 from the plate circuit of the triode 64.

The anode circuit of the triode 65 may be traced from the positive terminal 75 of the filter 71 through a fixed resistance 92 to the anode of the triode 65, the cathode thereof, and conductors 45, 85 and 72 to the negative terminal 74 of the filter. The ouput circuit of the triode 65 is resistance-capacity coupled to the input circuits of the triodes 67 and 68 by means including a condenser 93 and a resistance 94.

As illustrated the condenser 93 is connected between the anode of the triode 65 and a conductor 95, which in turn is connected to the control electrodes of the triodes 67 and 68, and the conductor 95 is also connected to the cathodes of those triodes through the resistances 94 and 97. Specifically, the resistance 94 is connected between the conductor 95 and ground, and the resistance 97 is connected between the cathodes of the triodes 67 and 68 and ground. The resistance 94 limits the extent to which the control electrodes of the triodes 67 and 68 may be driven positive with respect to their associated cathodes.

A voltage is supplied to the output circuits of the triodes 67 and 68 from the high voltage secondary winding 51 of the transformer I'. The anode of the triode 67 is connected to the left end terminal of the transformer secondary winding 51 and the anode of the triode 68 is connected to the right end terminal of the transformer secondary winding 51. The cathodes of the triodes 67 and 68 are connected together and through the fixed resistance 97 to ground, and the terminal 59' of the motor J is also connected to ground through the circuit O and the switches 35 and 116 as previously explained. The terminal 58 of the motor J is connected to the center tap 98 on the transformer secondary winding 51. Thus, the triodes 67 and 68 are utilized for supplying energizing current from the transformer secondary winding 51 to the phase winding 61 of motor J.

The motor J is preferably so constructed that the impedance of the winding 61, when shunted by a condenser 99 of suitable value, is of the proper value to match the impedance of the anode circuits of the triodes 67 and 68 when the motor is operating in order to obtain the most efficient operation. Preferably, the motor is so constructed that it has a high ratio of inductance to resistance, for example, of the order of 6-1 or 8-1 at the frequency of the energizing current supplied to it. This provides for maximum power during the running condition of the motor with the least amount of heating, and also provides a low impedance path for braking purposes.

As noted hereinbefore, energizing current is supplied to the motor winding 60 from the alternating current supply conductors L' and L² through the condenser 57. As previously explained, the condenser 57 is so selected with respect to the inductance of the motor winding 60 as to provide a series resonant circuit having a unity power factor. By virtue of the series resonant circuit, the total impedance of the motor winding 60 is substantially equal to the resistance of the winding, and since this resistance is relatively low, a large current flow through the winding 60 is made possible. This permits the attainment of maximum power and torque from the motor J. In addition, the current flow through the motor winding 60 is in phase with the voltage of the alternating current supply conductors L' and L² because of the series resonant circuit. The voltage across the motor winding 60, however, leads the current by substantially 90° because of the inductance of the winding 60.

Energizing current is supplied the motor winding 61 from the transformer secondary winding 51 through the anode circuits of the triodes 67 and 68 through the circuits previously traced. The condenser 99 is connected in parallel with the motor winding 61 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 67 and 68, and accordingly, provides efficient operation. The relatively low internal circuit impedance approximates the actual resistance of the winding 61, and since this resistance is relatively low, the impedance of the local circuit is also relatively low.

For the first half cycle of the alternating voltage produced across the terminals of the transformer secondary winding 51, the anode of the triode 67 is rendered positive with respect to the center tap 98, and during the following half cycle the anode of the triode 68 is rendered positive with respect to the center tap. Accordingly, the triodes 67 and 68 are arranged to conduct on alternate half cycles of the alternating current supplied by the supply conductors L' and L².

When no signal is impressed upon the control electrodes of the triodes 67 and 68, pulsating unidirectional current of twice the frequency of the alternating voltage supplied by conductors L' and L² is impressed on the motor winding 61. When thus energized the motor J is not urged to rotation in either direction but remains stationary. Due to the relatively high direct current component of the current then flowing through the motor winding 61, the core structure of the motor winding J tends to become saturated whereby the inductive reactance of the motor winding 61 is made relatively small. The value of the condenser 99, in shunt to the motor winding 61, is so chosen that the condenser and motor winding then provide a parallel resonant circuit. This saturation of the core structure of the motor J operates to exert an appreciable damping effect on the rotor 54, or in other words, an effect tending to prevent rotation of the rotor 54. Consequently, if the rotor 54 has been rotating, saturation of the motor core structure operates to quickly stop the rotation.

When an alternating signal voltage is impressed on the control electrodes of triodes 67 and 68, the magnitude of the pulses of current flowing in the anode circuit of one triode 67 or 68 will be increased while the magnitude of the pulses of current flowing in the anode circuit of the other triode 68 or 67 will be decreased. Accordingly, the pulses of unidirectional current supplied to the motor winding 61 during one half cycle will predominate over those supplied to the motor winding during the other half cycle. Which anode current will be increased depends upon whether the signal voltage is in phase or 180° out of phase with the voltage of supply conductors L' and L².

Such energization of the motor winding 61 operates to introduce therein an alternating component of current of the same frequency as that supplied by the alternating current supply conductors L' and L². This alternating component of current will either lead or lag the alternating current flowing through the motor winding 60 by approximately 90°, depending upon which of the triodes 67 and 68 has its anode current increased by the prevailing grid signal voltage, and with either phase relation the two currents produce a magnetic field in the motor core structure which rotates in one direction or the other, depending upon said current phase relation, and effects rotation of the motor rotor 54 in the corresponding direction. Moreover, when the motor winding 61 is so energized, the direct current component of the current flowing therein is decreased, and consequently the saturation of the motor core structure is decreased with the result that the rotor damping effect is reduced.

When the temperature of the thermocouple E then connected to the measuring circuit is steady and the positions of the pen carriage D and the contact C are correct for that temperature, no signal potential is transmitted to the controlling electrodes of the triodes 67 and 68 by the anode circuit of the triode 65. Since the grid bias potential is then zero, the rotor 54 of the motor J has no tendency to rotate. Upon an increase in the temperature of the thermocouple E, a signal potential will be applied to the control electrodes of the triodes 67 and 68 by the anode circuit of the triode 65 which will result in rotation of the motor J in a direction to move the pen carriage D up-scale. Conversely, upon a decrease in the temperature of the thermocouple E, a signal potential will be applied to the control electrodes of the triodes 67 and 68 by the anode circuit of the triode 65 which will result in rotation of the motor J in a direction to give the pen carriage D a down-scale adjustment.

With the control winding 61 of the motor J connected to ground through the transformer winding 30 and condenser 32, as shown, the transformer 24 couples the output and input circuits of the electronic amplifying system. The coupling transformer is then operative to transfer energy from the output circuit to the input circuit of the system as required for the maintenance of an oscillating current flow at a frequency determined by the parameters of the coupled circuits. The electronic amplifying and control system shown in Fig. 1 is of a standard and well known type, which has been in extensive use in this country for several years, and typical values of its resistance, inductance, and capacitance elements, and of its energizing voltages, are well known.

For the purposes of the present invention, the precise frequency of the high frequency oscillation current maintained is not critical. Advantageously, however, it is of the order of 15 to 20 kilocycles, in which frequency range the amplifier gain is considerably lower than it is for its normal operating range of 60 cycles. Consequently the high frequency oscillation does not overload the amplifier, nor significantly interfere with the available amplifier power output. To maintain current oscillations of that frequency in the standard amplifying system shown, the inductance of the coil 33 may well be 30 mhy. and the circuit including it and the condenser 34 will be broadly tuned when the capacitance of the condenser 34 is 0.005 microfarad. The energy transfer between the windings 23 and 30 may be varied by adjustment of the slider contact 29. Appropriate capacitance values for condensers 26, 36 and 39 are 500, 0.1 and 0.5 microfarads, respectively. The resistances 21 and 22 may be 25 and 150 ohms, respectively. The resistance 22 is a damping resistor, and the resistance 21 is employed to minimize the effect of changes in resistance of the potentiometer circuit between the point F and the contact C as the latter is moved along the range of the slide wire resistance B.

Figure 2:
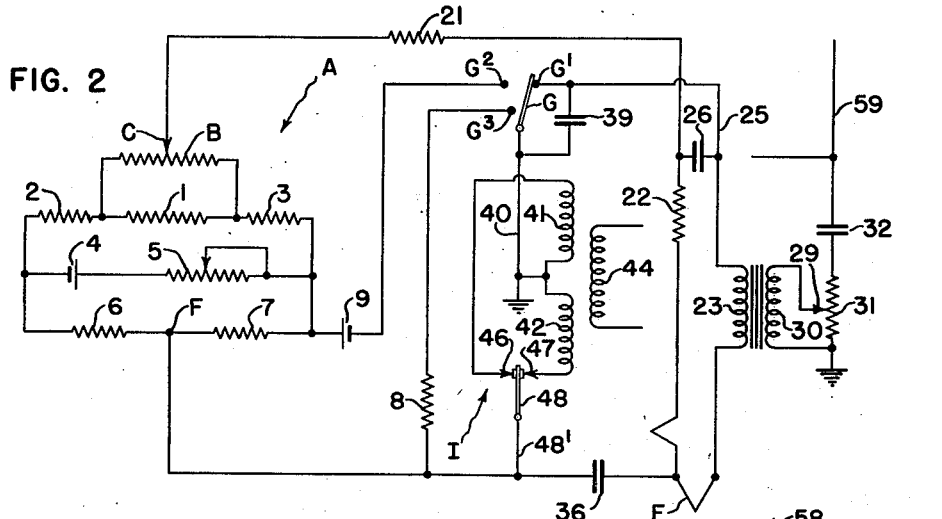
Fig. 2 is a simplified diagram illustrating characteristic features of the arrangement shown in Fig. 1.

Fig. 2 is a simplified showing of the feedback and amplifier inputs from which it is readily apparent that there are three circuit branches for high frequency current flow connected in parallel to the secondary winding 23 of the coupling transformer 24, namely: the branch including the damping resistor 22, thermocouple E, and condenser 26; the branch including the condenser 26, resistance 21, slider contact C, bridge point F, condenser 36, thermocouple E, and the measuring bridge circuit connecting said contact and point; and the circuit including thermocouple E, condenser 36, conductor 48', vibrator reed 48, transformer primary windings 41 and 42, and switch contact members G and G'.

As Fig. 2 makes clearly apparent, the condenser 39 maintains a high frequency current path of flow through the last mentioned circuit branch during the standardizing operation in which the switch member G is disconnected from the contact member G'. The circuit branch including the damping resistor 22 is of relatively high impedance which does not vary in operation, and proper operation could be maintained even if the value of resistance 22 were materially lower than 150 ohms. The resistance 21 is needed because the resistance of the measuring circuit between the contact C and point F varies quite widely as the contact C is adjusted, and can be quite low when that contact is at one end of its range of movement.

With the standard amplifying and control system shown, the high frequency oscillating current will ordinarily be maintained during alternate half-cycles only of the 60 cycle alternating supply voltage used in energizing the power stage of the system. This is due to the fact that the phasing of the input transformer H changes during each half cycle and one phase only is suitable for generation of high frequency signals. However, if an excessive amount of feed back signal is supplied to the thermocouple input circuit, high frequency oscillations are produced during each half cycle, probably as a result of the capacitance coupling of the windings of the input transformer H.

The amplifying and control apparatus shown in Fig. 1, including the coupling connection between the amplifier input and output circuits hereinafter described, is so proportioned and arranged that in regular use the high frequency signal may be detected in the amplifier output circuit at all times at which the 60 cycle signal impressed on the amplifier input circuit does not exceed its maximum normal operation value, and will disappear when the 60 cycle signal increases above said value.

With the apparatus shown in Fig. 1 in its normal operating condition, the high frequency signal is maintained as well when the potentiometer system is balanced and the motor J is stationary, as when the system is unbalanced and the motor J is revolving in one direction or the other. Moreover, the high frequency oscillating current will not be interrupted by the adjustment of the switch member G, or as a result of changes in the thermocouple electromotive force and the resultant rebalancing adjustments of the slider contact C. The high frequency current will be interrupted, however, by the development of any one of numerous defects or failures in the amplifying and control system which will prevent the apparatus from functioning properly.

Thus the high frequency current flow will be interrupted not only on a breakage in the thermocouple, but also when an incipient thermocouple failure results in a substantial increase in the thermocouple resistance. Normally the resistance of the thermocouple is so small as to be negligible in this connection, but in an incipient stage of its failure the thermocouple resistance may increase to one or two hundred ohms before the actual thermocouple breakage occurs. As Fig. 2 makes apparent, such an increase in thermocouple resistance would interrupt the high frequency current flow through all of its paths of flow in the input circuit portion of the amplifying and control system. The high frequency current will also be interrupted on the failure of any of the voltage amplifier tubes, and on the development of any defect in the control system causing any one of the amplifier tubes to be over-driven. Furthermore, any mechanical failure of the motor preventing the latter from rotating will soon interrupt the high frequency current as the resultant measuring circuit unbalance increases so that a 60 cycle voltage signal will be impressed on the amplifier which is large enough to over-drive any one of the amplifier tubes.

The appearance and disappearance of the high frequency signal under different conditions as above described may be explained as follows. In the contemplated use of the apparatus shown in Fig. 1, the high frequency signal rides on top of the normal 60 cycle signal impressed on the amplifying and control system through the transformer H, and is continuously apparent in the amplifier output circuit so long as the amplitude of the 60 cycle signal is within its normal predetermined range. The high frequency signal is clipped or interrupted as a result of cut-off and/or saturation of the plate current in the third stage amplifying triode 65 on an abnormal increase in the 60 cycle signal produced by the development of any of the above mentioned operation defects. The conditions of operation under which the high frequency signal will and will not ride through the amplifier on the 60 cycle signal may be varied by changing the amplitude of either or both of said signals. In ordinary practice however, the apparatus must be so proportioned and arranged that the maximum normal amplitude of the 60 cycle signal is that required to insure the desired operation characteristics of the rebalancing motor J. It is readily possible, however, to make the amplitude of the high frequency signal such that that signal will be readily detectable in the amplifier output circuit at all times in which the 60 cycle signal is not abnormally high.

In this connection, assume that the apparatus is so proportioned and arranged that with intermediate values of the two signal currents, the high frequency signal will appear in the amplifier output circuit superimposed upon the peak portions of the low frequency signal current. In such case, the extent of increase in the low frequency signal current required to prevent the appearance of the high frequency signal in the output circuit may be increased and decreased by respectively increasing and decreasing the high frequency signal current.

A detector and relay circuit operative to open the switch 116, and if desired, to actuate a signal, on the interruption of the high frequency current due to apparatus defects may take various forms. In Fig. 1 I have illustrated a detector and relay circuit N of desirable form for use in an arrangement of the type shown in Fig. 1. This detector circuit comprises electronic amplifying and control means for amplifying the high frequency potential difference between the conductor 59 and ground. It also comprises an electromagnetic relay mechanism controlled by said means and operating the previously mentioned switch 116, and, as shown, also operating a signal controlling switch 117.

The detector system of Fig. 1 comprises an electronic valve 100 having its anode and its control electrode connected to the conductor 59 through a branch conductor 101 and a condenser 103, and having its cathode connected to ground through a resistance 102 which may be of two megohms. To suitably minimize the amount of amplification of 60 cycle signal reaching the valve 100, I provide a filter comprising the condenser 103, through which the conductor 101 is connected to the anode of valve 100, and a resistance 104 through which said anode is connected to ground. The condenser 103 may have a capacitance of 0.0025 microfarad, and the resistance 104 may be 10,000 ohms. As shown, a condenser 105 of 0.05 microfarad is connected in parallel with the resistance 102. The cathode of valve 100 is also connected through a resistance 106, which may well be 0.25 megohm, to the control grid of a second electronic valve 107. The latter is a triode and may be the second of the two valves of a 7N7 tube, the valve 100 being the first valve.

The plate circuit of the valve 107 includes the secondary winding 108 of a transformer 109 which has its primary winding 110 connected to the 60 cycle supply conductors L' and L². One terminal of the secondary winding 108 is connected to the cathode of the valve 107 by a variable resistance 111 having a maximum resistance value which may well be 500 ohms. By varying the amount of the resistance 111 in circuit, the sharpness of the response to the decrease in the high frequency signal may be regulated. A secondary winding 112 of the transformer 109 is employed to raise the potential of the cathode of the valve 107 relative to the ground potential and to the potential of the control grid of the valve 107. The transformer secondaries 108 and 112, may well develop voltages of 225 and 12 volts, respectively.

The plate circuit of the valve 107 includes in series with the transformer secondary 108 the winding 114 of an electromagnetic relay switch mechanism which when energized closes the previously mentioned switch 116 and opens the signal switch 117. As shown, a condenser 115 of 8 microfarads capacity is connected in shunt to the winding 114. The switch 117, when closed, connects the terminals of an alarm, which may be an electric lamp 118 or an electric bell, to the supply conductors L' and L². The switch 116 is biased to open its contacts when the winding 114 is deenergized, and the switch 117 is biased to close its contacts when the winding 114 is deenergized.

The detector and relay circuit N shown in Fig. 1 and comprising only the circuit elements 100–118 hereinbefore mentioned does not differ significantly from detector and relay circuits disclosed in my prior applications mentioned above. Used alone, that circuit would deenergize the relay winding 114 and open the switch 116 and thus interrupt the operation of the motor J on any interruption in the high frequency signal normally transmitted to the circuit N through the conductor 101, just as would the detector and relay circuits disclosed in my prior applications.

In accordance with the present invention, I prevent the deenergization of the relay 114 and the opening of the switch 116 of Fig. 1 on the disappearance of the high frequency signal, when that disappearance is due only to operation of the motor J at full speed, by associating additional means with the circuit N. Such additional means, in the form shown in Fig. 1, comprises a high frequency choke coil P, an attenuating network Q, a diode rectifier R, and a ripple smoothing filter S. The elements P, Q, R and S are connected in series, in the order stated, between the terminal 58 of the motor control winding 61 and the circuit N at the junction of resistors 102 and 106, the coil P being connected to said terminal 58 by a conductor 119, and the filter S being connected to the circuit N by a conductor 120.

The circuit branch including the elements P, Q, R and S is thus connected across the amplifier output terminals in parallel with the motor control winding 61 and derives from said winding a unidirectional signal substantially proportional to the motor speed. That signal is applied to the circuit N in such a manner that the operative condition of that circuit is not changed by the disappearance of the high frequency signal as a result of development of full motor speed.

The attenuating circuit network Q is of the type which is known as a Parallel-T resistance-capacitance frequency-selective network, and is discussed in some detail by Leonard Stanton in the Proceedings of the Institute of Radio Engineers for July, 1946, vol. 34, pp. 447–456. Such a network is commonly referred to as a parallel T RC filter network, and the network Q shown in Fig. 1 comprises a pair of resistors 121 and 122 connected in series with one another between the choke coil P and rectifier R and in parallel with two condensers 123 and 124. The latter are connected in series with one another. The connected terminals of the resistors 121 and 122 are connected to ground through a condenser 125. The connected terminals of the condensers 123 and 124 are connected to ground through a resistor 126. The filter S is shown as comprising series connected resistors 127 and 128 and condensers 129 and 130 connecting the terminals of the resistor 127 to ground. The condensers and resistors included in the parallel T RC network Q are proportioned in a known manner to attenuate signals of 120 cycle frequency. The choke coil P is proportioned to attenuate the high frequency signals developed across the coil 33 of the element O in series with the motor control winding. By way of illustration and example it is noted that the inductance of the choke coil P may be about 300 mhy., the network Q resistors 121, 122 and 126 may have resistances of 35 K, 35 K, and 17.5 K ohms, respectively, and the capacity of the condensers 123, 124 and 125 may have capacities of 0.038, 0.038 and 0.075 microfarad. The resistors 127 and 128 of the filter S may have resistances of 250 K ohms and 1 megohm, respectively, and the capacities of the condensers 129 and 130 may each be 0.25 microfarad.

In the normal operation of the apparatus shown in Fig. 1, the choke coil P attenuates high frequency signals developed across the coil 33 of the element O in series with the motor control winding 61, and the parallel T RC network Q attenuates 120 cycle signals so that said signals cannot pass to and be rectified by the diode rectifier R. The attenuation of 120 cycle signals is practically important because of the fact that when the measuring apparatus is balanced and the motor J is at rest, a substantial 120 cycle voltage is developed across the winding 61. When the measuring apparatus is unbalanced, the motor rotates in one direction or the other as required to rebalance the apparatus, and a 60 cycle voltage of one phase or of the opposite phase is then developed across the winding 61. The amplitude of this 60 cycle voltage is approximately proportional to the motor speed. Owing to the attenuating actions of the coil P and network Q, the voltage rectified by the rectifier R, and filtered by the filter S, is substantially proportional to the 60 cycle motor voltage developed across the winding 61 by the operation of the motor J.

The rectified 60 cycle voltage is positive and is applied across the resistor 102. The latter is effectively included in the input circuit of the triode 107, and the voltage applied to the resistance 102 through the conductor 120 raises the grid potential relative to the cathode potential of the valve 107, so that the normal conductivity of the valve 107 is maintained as the motor speed builds up to its full normal value and thereby causes the disappearance of the high frequency signal. The disappearance of the last mentioned signal would make the valve 107 non-conductive but for the rectified 60 cycle voltage applied to the circuit N through the conductor 120. If a failure in the apparatus resulting in a motor drive signal high enough to cause the disappearance of the high frequency signal occurs under such conditions that the motor then fails to operate at full speed, the voltage then developed across the motor control winding 61 and rectified by the diode R will not produce a sufficient potential drop across the resistor 102 to maintain the conductivity of the triode 107, and the relay 114 will then be deenergized. With the apparatus in its normal operative condition, full speed operation of the motor balancing operation will cause the high frequency signal to disappear without deenergizing the relay 114, because of the bias voltage produced across the resistor 102 by the current flow to said resistor through conductor 120. As the balancing action approaches completion and the motor speed is reduced, said bias voltage decreases and the high frequency signal reappears and regains complete control of the safe failure system.

The ability of the apparatus shown in Fig. 1 to effect rebalancing operations at full speed is of especial importance in measuring a plurality of voltages successively when the successively measured voltages may vary widely so that a balancing operation may involve travel of the pen carriage from one side to the other of the strip chart or other record surface. While Fig. 1 diagrammatically illustrates a switch e for alternately coupling two thermocouples E to the measuring circuit, in practice many more than two thermocouples, or other voltage sources, are frequently connected to the measuring apparatus in regular succession by means of a suitable selector switch mechanism, which may be any one of various known types.

Figure 3:
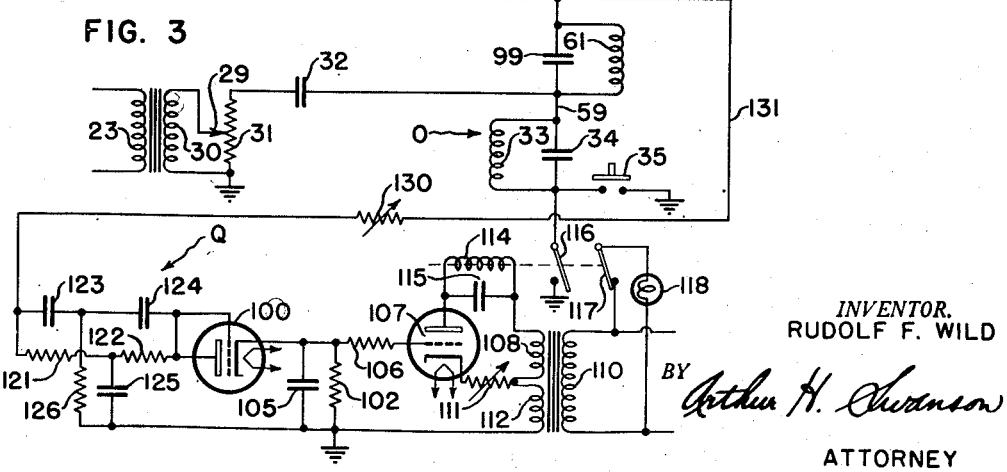

The deenergization of the safe failure relay circuit on the development of full motor speed while the apparatus is in a fully operative condition can be prevented by means quite different from that shown in Fig. 1. Thus, for example, both the 60 cycle signal proportional to motor speed and the high frequency signal may be transmitted as shown in Fig. 3, through a parallel T RC network tuned to attenuate 120 cycle signals, to the control grid of the valve 107 of the circuit N. In Fig. 3, the anode of the rectifier valve 100 is connected to the terminal 58 of the motor control winding 61 through a parallel T RC attenuating network Q, a variable resistance 130, and a conductor 131. The attenuating network Q of Fig. 3 may be exactly like that of Fig. 1. The resistance 130 may be adjusted to regulate the high and low frequency signal voltages applied to the network Q.

Figure 4:
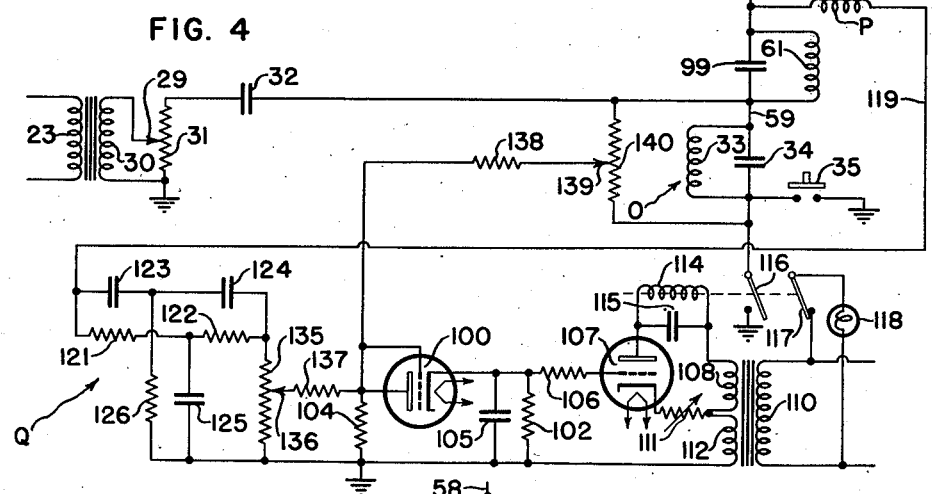
Figs. 3 and 4 are diagrams each illustrating a different modification of the apparatus shown in Fig. 1.

Another detector and relay circuit arrangement, which I now consider preferable to those shown in Figs. 1 and 3, is illustrated in Fig. 4. In Fig. 4, an attenuating circuit Q like that shown in Fig. 1 has the connected terminals of its resistance 121 and condenser 123 connected to the terminal 58 of the motor control winding 61 by a conductor 119 and a choke coil P as in Fig. 1, and has the connected terminals of its resistance 122 and condenser 124 connected to ground through a potentiometer or slide wire resistance 135. A slider contact 136 in engagement with the resistance 135 is connected through a fixed resistor 137 to the anode of the rectifier valve 100. The anode of the valve 100 is also connected through an isolation resistor 138 to a slider contact 139 engaging a slide wire resistance, 140. The latter is connected in shunt to the element O, which has one terminal connected to the switches 35 and 116, and has its second terminal connected to the conductor 59 and through the condenser 32 and potentiometer resistance 31 to the primary winding 30 of the coupling transformer 24.

In Fig. 4 as in Figs. 1 and 3, the attenuating network Q supplies a 60 cycle signal proportional to the speed of the motor J which is adapted to maintain the conductivity of the valve 107 and the energization of the relay winding 114 when the motor is operating at full speed and the high frequency cycle has disappeared and thus ceases to maintain the conductivity of the valve 107.

With the arrangement shown in Fig. 4, the slide wire resistor 140, contact 139, and isolation resistor 138, form a simple and effective means for developing an adjustable amount of the high frequency signal voltage across the load resistor 102. The slide wire resistor 135, contact 136 and isolation resistor 137 form effective means for transmitting to the anode of the rectifier valve 100 an adjustable amount of a 60 cycle voltage signal proportional to the motor speed. The two slider contacts 136 and 139 and associated slide wire resistors thus form simple and effective means for suitably proportioning and relating the high frequency and low voltage signals which jointly control the relay 114 and device 118. The two slider contacts and associated resistors thus contribute to desirable apparatus sensitivity control.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. The combination with electrical measuring and controlling apparatus comprising an electronic amplifier having an input circuit and an output circuit, terminal means adapted to connect measuring means to said input circuit, said measuring means being responsive to variations in a variable quantity and being adapted on a change in said quantity to impress on said input circuit an alternating current signal of relatively low frequency and of a phase dependent on the direction of said change and of a magnitude varying with the magnitude of said change, and a mechanism including a winding connected to said output circuit and controlled by the amplified signal for operation in a direction and with a speed in selective accordance with the phase and magnitude of said signal, of means coupling said input and output circuits to transfer energy from said output circuit to said input circuit and thereby impress a relatively high frequency signal on said input circuit, the magnitude of said low frequency signal being such that with the apparatus in normal operative condition, the high frequency signal will be clipped or cut off when said mechanism is operating at full speed and will be carried through the amplifier on the low frequency signal when the mechanism is operating at a speed somewhat below full speed, safety means including means responsive to said high frequency signal and normally operative to produce a control effect when said high frequency signal disappears, said safety means including a control portion operative in the presence of a control signal to allow or prevent the production of said control effect, electrical circuit means having an input portion connected to said output circuit and on which said output circuit is operative to apply a signal the magnitude of which is a function of the speed of operation of said mechanism, said electrical circuit means having an output portion and being operative to produce in said output portion a unidirectional control signal the magnitude of which is a function of said speed of operation, and conductors connected between said output portion and said control portion of said safety means and operative to apply said unidirectional control signal to said control portion to prevent the production of said control effect by the full speed operation of said mechanism when said apparatus is in its normal operative condition.

2. A combination as specified in claim 1, in which the means for deriving a unidirectional signal and applying it to said safety means includes a choke coil for attenuating high frequency signals.

3. A combination as specified in claim 1, in which the means for deriving a unidirectional signal and applying it to said safety means includes resistors and condensers forming tuned means for attenuating signals of a relative low frequency different from that of the low frequency first mentioned.

4. A combination as specified in claim 1, in which the means for deriving a unidirectional signal and applying it to said safety means includes resistors and condensers forming a parallel T RC circuit network tuned to attenuate signals of a relative low frequency different from that of the low frequency first mentioned.

5. The combination as specified in claim 1 in which the amplified signal in the output circuit of said amplifier may comprise in addition to a component of said low frequency and a component of said high frequency, a third component of a second relatively low frequency which is different from the first mentioned low frequency, and in which the means connected to said output circuit to apply a signal proportional to the speed of operation of said mechanism to said safety means comprises circuit connections between said output circuit and said safety means including a parallel T RC circuit element tuned to attenuate signals of said second low frequency.

6. A combination as specified in claim 1, in which the means connected to said output circuit to apply a signal proportional to the speed of operation of said mechanism to said safety means comprises a circuit connection between said output circuit and said safety means including attenuating means for attenuating signals of frequencies different from said low frequency, and including a rectifier.

7. A combination as specified in claim 1, in which the amplified signal in the output circuit of said amplifier may comprise in addition to a component of said low frequency and a component of said high frequency, a third component of a second low frequency which is different from the first mentioned low frequency, and in which the means connected to said output circuit to apply a signal proportional to the speed of operation of said mechanism to said safety means comprises a circuit connection between said output circuit and said safety means including a choke coil for attenuating said high frequency signal, a tunable attenuating element tuned to attenuate signals of said second low frequency, and a rectifier.

8. A combination as specified in claim 7, including a filter through which said unidirectional signal passes from said rectifier to said safety means.

9. A combination as specified in claim 1, in which said safety means comprises a circuit network including amplifying means having an input circuit and an output circuit, a relay winding included in said output circuit, rectifying means for deriving a unidirectional current signal from the high frequency signal to which said safety means is responsive, and a resistance included in the input circuit of said amplifying means and through which each of said unidirectional currents flows in a direction to make said amplifying valve conductive.

10. In electrical measuring and controlling apparatus comprising an electronic amplifier having an input circuit and an output circuit, terminal means adapted to connect measuring means to said input circuit, said measuring means being responsive to variations in a variable quantity and being adapted on a change in said quantity to impress on said input circuit an alternating current signal of relatively low frequency and of a phase dependent on the direction of said change and of a magnitude varying with the magnitude of said change, a mechanism including a winding connected to said output circuit and controlled by the amplified signal for operation in a direction and with a speed in selective accordance with the phase and magnitude of said signal, said amplifier also being operative in the absence of the first mentioned signal to impress on said winding a braking signal tending to prevent operation of said mechanism and having a frequency substantially different from said relatively low frequency, means coupling said input and output circuits to transfer energy from said output circuit to said input circuit and thereby impress a relatively high frequency signal on said input circuit, the magnitude of said low frequency signal being such that with the apparatus in normal operative condition, the high frequency signal will be clipped or cut off when said mechanism is operating at full speed and will be carried through the amplifier on the low frequency signal when the mechanism is operating at a speed somewhat below full speed, and safety means including means responsive to said high frequency signal and normally operative to produce a control effect when said high frequency signal disappears, said safety means including a control portion operative in the presence of a control signal to allow or prevent the production of said control effect, the improvement comprising electrical frequency selective means having an input portion connected to said output circuit and on which said output circuit is operative to apply said braking signal and a signal of said relatively low frequency and of a magnitude which is a function of the speed of operation of said mechanism, said electrical frequency selective means having an output portion and being insensitive to said braking signal but being operative to produce in said output portion a unidirectional control signal the magnitude of which is a function of said speed of operation, and conductors connected between said output portion and said control portion of said safety means and operative to apply said unidirectional control signal to said control portion to prevent the production of said control effect by the full speed operation of said mechanism when said apparatus is in its normal operative condition.

RUDOLF F. WILD.

REFERENCES CITED

The following references are of record in the file of this patent:

UNITED STATES PATENTS

| Number | Name | Date |
|---|---|---|
| 2,452,023 | Wild | Oct. 19, 1948 |